(12) United States Patent
Shil (10) Patent No.: US 10,915,350 B2
(45) Date of Patent: Feb. 9, 2021

(54) METHODS AND SYSTEMS FOR MIGRATING ONE SOFTWARE-DEFINED NETWORKING MODULE (SDN) TO ANOTHER SDN MODULE IN A VIRTUAL DATA CENTER

(71) Applicant: VMware, Inc., Palo Alto, CA (US)

(72) Inventor: Suman Chandra Shil, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 208 days.

(21) Appl. No.: 16/026,302

(22) Filed: Jul. 3, 2018

(65) Prior Publication Data
US 2020/0012505 A1   Jan. 9, 2020

(51) Int. Cl.
| | | |
|---|---|---|
| *H04L 29/08* | (2006.01) | |
| *G06F 9/455* | (2018.01) | |
| *H04L 12/24* | (2006.01) | |
| *H04L 12/46* | (2006.01) | |

(52) U.S. Cl.
CPC ...... *G06F 9/45558* (2013.01); *H04L 12/4633* (2013.01); *H04L 12/4641* (2013.01); *H04L 41/0873* (2013.01); *H04L 67/10* (2013.01); *G06F 2009/4557* (2013.01); *G06F 2009/45562* (2013.01); *G06F 2009/45595* (2013.01)

(58) Field of Classification Search
CPC ....... G06F 9/45558; G06F 2009/45562; G06F 2009/4557; G06F 2009/45595; H04L 41/0873; H04L 67/10; H04L 12/4633; H04L 12/4641; H04L 67/34
See application file for complete search history.

(56) References Cited

U.S. PATENT DOCUMENTS

| | | | |
|---|---|---|---|
| 10,031,652 B1 * | 7/2018 | Yang | ........................ H04L 67/36 |
| 10,261,775 B1 * | 4/2019 | Ramsay | .............. G06F 9/45558 |
| 2016/0335940 A1 * | 11/2016 | You | ........................... G06F 3/14 |

* cited by examiner

*Primary Examiner* — Benjamin R Bruckart
*Assistant Examiner* — Tien M Nguyen
(74) *Attorney, Agent, or Firm* — Patterson + Sheridan, LLP (57) ABSTRACT

A system and method of migrating a first module to a second module in a data center are disclosed. In certain aspects, a method includes instantiating a migration of the first module to the second module, wherein the first module operating with a configuration in a data center. The method also includes retrieving results of a compatibility check performed by a migration coordinator to determine potential incompatibilities between the configuration of the first module and the second module, the results including a first set of incompatibilities to be resolved. The method further includes requesting user input relating to the first set of incompatibilities. The method also includes periodically determining whether user input relating to the first set of incompatibilities has been received until a time threshold is reached.

20 Claims, 4 Drawing Sheets

METHODS AND SYSTEMS FOR MIGRATING ONE SOFTWARE-DEFINED NETWORKING MODULE (SDN) TO ANOTHER SDN MODULE IN A VIRTUAL DATA CENTER

BACKGROUND

A typical virtual data center (also referred to as a software-defined data center) includes many, perhaps thousands, of virtual computing instances such as virtual machines (VMs) or containers that run on hosts of the virtual data center. Hypervisors running on the hosts abstract hardware resources of the host into VMs. The VMs are connected to logical overlay networks that may span multiple hosts and are decoupled from the underlying physical network infrastructure. For example a logical overlay network, also referred to as a "logical network" or "software defined network (SDN)," may include logical networking elements. Logical network elements such as logical switches and logical routers are decoupled from the underlying physical network infrastructure by way of network tunneling between hosts. Thus, any arbitrary set of VMs in a datacenter may be placed in communication across a logical Layer 2 network by connecting them to a logical switch. The logical switch is collectively implemented by virtual switches on each host that has a VM connected to the logical network. The virtual switch on each host operates as a managed edge switch implemented in software by the hypervisor on each host. Forwarding tables at the virtual switches instruct the host to encapsulate packets, using a tunnel endpoint (TEP) from a participating VM to another VM on the logical network but on a different (destination) host with an outer IP header addressed to the destination host using a mapping of VM IP addresses to host IP addresses. At the destination host, a second tunnel endpoint decapsulates the packet and then directs the packet to the destination VM. Logical routers extend the logical network across subnets or other network boundaries using IP routing in the logical domain.

Logical networks and VMs are enabled and managed in the virtual data center by a software-defined networking (SDN) module (e.g., a management plane and a central controller) that runs on one or more hosts (e.g., as a distributed controller/management plane or a single controller/management plane running directly on the one or more hosts, within one or more VMs, etc.). The SDN module operates with a certain set of configurations (e.g., user defined configurations). In certain cases, there may be a need to replace a currently deployed SDN module with a different type of SDN module. For example, an existing SDN module may be unable to support certain types of hypervisors running on hosts in the virtual data center. In such cases, a new SDN module can be deployed in the virtual data center to replace the existing SDN module. Such a deployment may be referred to as a migration of the existing SDN module to the new SDN module. To the extent possible, the new SDN module is deployed with the same configuration as that of the existing SDN module to, among other things, avoid disrupting the networking operations of the VMs in the data center and/or the need for having to reconfigure the new SDN module from scratch.

In some cases, the migration is a task that is executed by a state machine in a number of sequential stages. In some cases, the state machine runs on one or more hosts (directly on the one or more hosts, within one or more VMs, etc.) in the virtual data center. After a migration is initiated by the state machine, in some cases, a number of incompatibilities between the existing SDN module's configuration and the new SDN module are identified. In such cases, the migration fails and the state machine is terminated to allow user intervention for resolving the incompatibilities. Once the incompatibilities are resolved, a new migration session has to be started from scratch. However, terminating the state machine in cases where incompatibilities are found and initiating a new state machine from scratch is not resource efficient.

SUMMARY

Herein described are one or more embodiments of a method for migrating a first software defined networking (SDN) module to a second SDN module in a data center are disclosed. The method includes instantiating a migration of the first SDN module to the second SDN module, wherein the first SDN module operates according to a configuration. The method also includes retrieving results of a compatibility check performed by a migration coordinator to determine potential incompatibilities between the configuration of the first SDN module and the second SDN module, the results including a first set of incompatibilities to be resolved. The method further includes entering a state to indicate to a user that user input relating to the first set of incompatibilities is requested. The method also includes inserting a user input record in a database system of an infrastructure platform supporting the data center. Further, the method includes periodically determining whether user input relating to the first set of incompatibilities has been received by querying the user input record in the database system. Upon determining that user input relating to the first set of incompatibilities has not been received, the method further includes continuing to periodically determine if user input relating to the first set of incompatibilities has been received. Upon determining that user input relating to the first set of incompatibilities has been received, the method further includes indicating the received user input to the migration coordinator, wherein the migration coordinator alters the configuration to resolve the first set of incompatibilities based on the user input.

Also described herein are embodiments of a computer system, wherein software for the computer system is programmed to execute the method described above for migrating a first software defined networking (SDN) module to a second SDN module in a data center.

Also described herein are embodiments of a computer system comprising means for executing the method described above for migrating a first software defined networking (SDN) module to a second SDN module in a data center.

Also described herein are embodiments of a non-transitory computer readable medium comprising instructions to be executed in a computer system, wherein the instructions when executed in the computer system perform the method described above for migrating a first software defined networking (SDN) module to a second SDN module in a data center.

DETAILED DESCRIPTION

Figure 1:
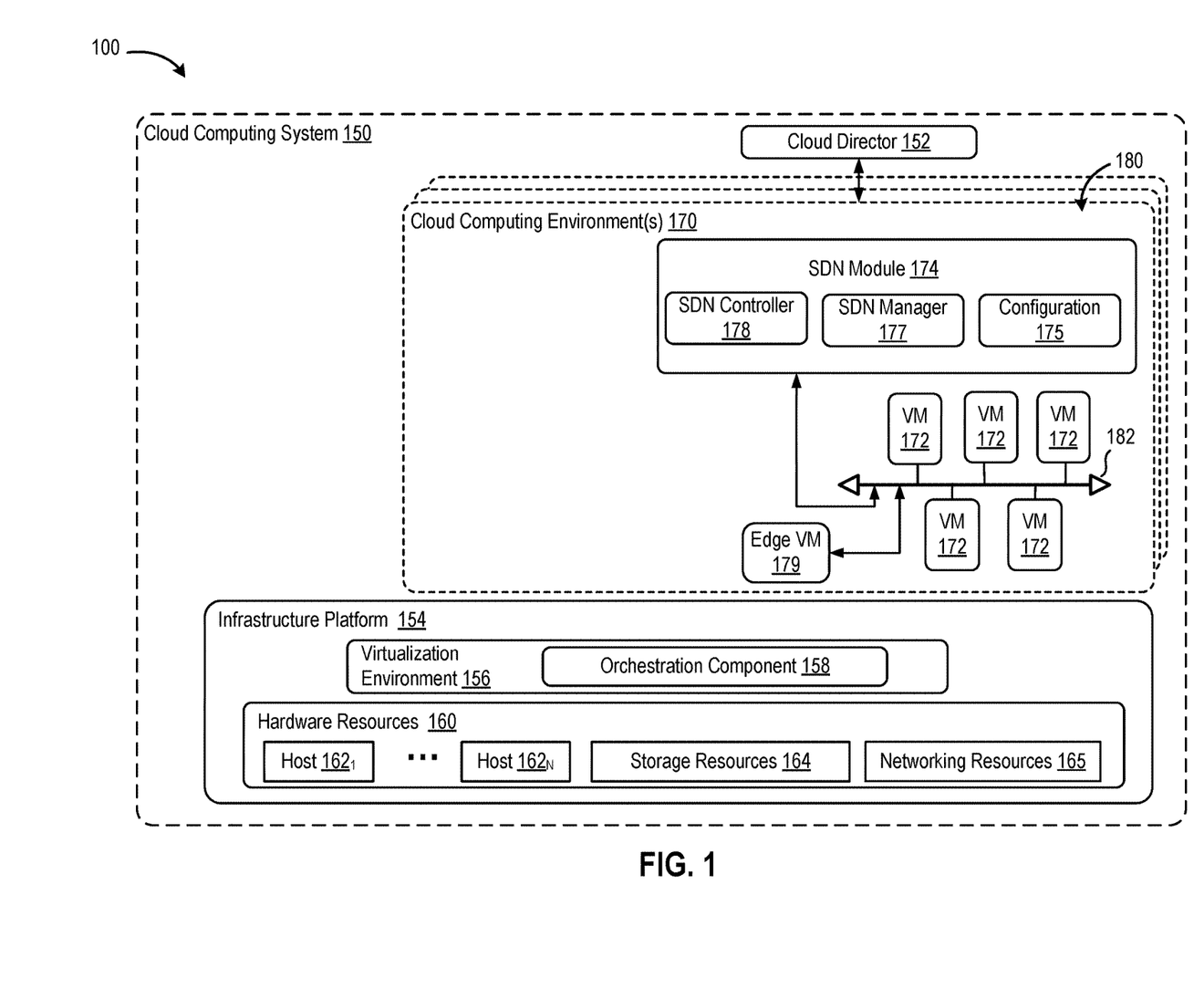
FIG. 1 is a block diagram of a cloud computing system in which aspects of the present disclosure may be practiced.

FIG. 1 is a block diagram of a cloud computing system 150 in which one or more aspects may be utilized. Cloud computing system 150 is configured to dynamically provide an enterprise (or users of an enterprise) with one or more virtual data centers 180 in which a user can provision VMs 172, deploy multi-tier applications on VMs 172, and/or execute workloads. Cloud computing system 150 includes an infrastructure platform 154 upon which a cloud computing environment 170 can be executed. In the particular aspect of FIG. 1, infrastructure platform 154 includes hardware resources 160 having computing resources (e.g., hosts $162_1$ to $162_N$), storage resources 164, and networking resources 165, which are configured in a manner to provide a virtualization environment 156 that supports the execution of a plurality of virtual machines 172 across hosts 162, as described in further detail in relation to FIG. 1A. Storage resources 164 may include a storage area network (SAN), distributed virtual SAN, or network-attached storage (NAS) and other network data storage systems. Networking resources 165 may include switches, routers, and other network devices for connecting hosts 162 together and with network entities outside infrastructure platform 154.

Figure 1A:
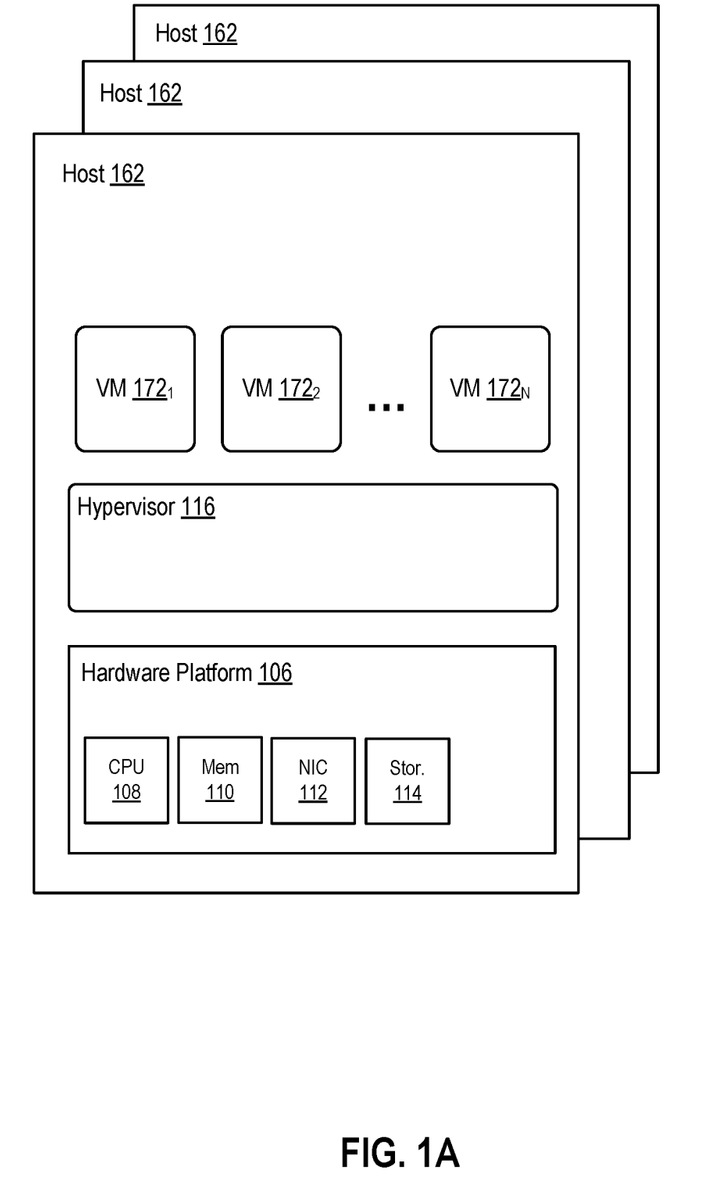
FIG. 1A is a block diagram of one of physical hosts of FIG. 1, according to certain aspects described herein

FIG. 1A illustrates example components of a host 162 of FIG. 1. As shown host 162 may be constructed on a server grade hardware platform 206, such as an x86 architecture platform. Hosts 162 may be geographically co-located servers on the same rack or on different racks in any arbitrary location in a datacenter. Host 162 is configured to provide a virtualization layer, also referred to as a hypervisor 116, that abstracts processor, memory, storage, and networking resources of hardware platform 106 into VMs 172 that run concurrently on the same host. In certain aspects, hypervisor 116 abstracts hardware resources of hardware platform 106 into any other type of virtual computing instance (VCI). The term "VCI" may refer to VMs, containers, Docker containers (see, e.g., www.docker.com), data compute nodes, isolated user space instances, namespace containers, and the like. Though certain embodiments are described with respect to VMs, it should be noted that the same techniques may be applied to other types of VCIs.

Hypervisor architecture may vary. Hypervisor 116 may run on top of the operating system in host 162 or directly on hardware platform 106 of host 162. In some embodiments, a virtualization software (e.g., a hypervisor) can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. In certain aspects, hypervisor 116 may be implemented using VMware ESX™-based hypervisor technologies (provided by VMware, Inc. of Palo Alto, Calif.) on hosts 162. Although it should be recognized that any other virtualization technologies, including Xen® and Microsoft Hyper-V virtualization technologies may be utilized consistent with the teachings herein.

Hardware platform 106 of each host 162 include components of a computing device such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a network. Network interface 112 may include one or more network adapters or ports, also referred to as Network Interface Cards (NICs), for connecting to one or more physical networks.

Storage system 114 represents persistent storage devices (e.g., one or more hard disks, flash memory modules, solid state disks, and/or optical disks). Host 162 may be coupled to external storage resources (e.g., storage resources 164). System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

As described above, a hypervisor 116 implemented on each host 162 abstracts the hardware resources of the host into a number of VMs 172. In certain aspects, VMs 172 of one or more hosts are part of a virtual data center 180 (virtual data center 180 shown in FIG. 1) and, for example, run workloads for one or more tenants of a cloud computing environment (computing environment 170 shown in FIG. 1).

More specifically, referring back to FIG. 1, each cloud computing environment 170 is associated with a particular tenant of cloud computing system 150. In one aspect, cloud computing environment 170 is configured as a dedicated cloud service for a single tenant comprised of dedicated hardware resources 160 (i.e., physically isolated from hardware resources used by other users of cloud computing system 150). In other aspects, cloud computing environment 170 is configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In certain aspects, virtualization environment 156 includes a server virtualization platform, which include hypervisors 116 implemented on hosts 162, a storage virtualization platform (virtual SAN (VSAN) available by VMware, Inc., of Palo Alto, Calif.), and/or a network virtualization platform (e.g., VMware NSX available by VMware, Inc., of Palo Alto, Calif.). In certain aspects, an orchestration component 158 (e.g., implemented as a process running in a VM) provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one aspect, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In certain aspects, orchestration component 158 may also instantiate virtual hosts. In certain aspects, a virtual host is a virtual entity that utilizes compute cycles of one or more hosts 162. A virtual host may act as a physical host and run processes and execute instructions.

In one aspect, cloud computing system 150 includes a cloud director 152 (e.g., running in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 is configured to authenticate connection attempts from the enterprise using credentials issued by the cloud computing provider. Cloud director 152 maintains and publishes a catalog of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted via, for example, REST API calls and may propagate such requests to orchestration component 158 to instantiate the requested virtual machines (e.g., VMs 172).

In the aspect of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VMs 172 can be created, stored, and operated, enabling complete abstraction between the consumption of infrastructure service and underlying resources. As described above, VMs 172 are configured as abstractions of processor, memory, storage, and networking resources of hardware resources 160.

Virtual data center 180 includes one or more logical networks 182 used for communication between VMs 172 as well as communication between VMs 172 and network entities located outside virtual data center 180. Logical networks 182 are enabled and managed by a software-defined networking (SDN) module 174 providing a set of distributed management plane and control plane functionalities. In certain aspects, SDN module 174 is implemented as part of the network virtualization platform of virtualization environment 156 running on hosts 162. In certain other aspects, one or more components of SDN module 174 may run on a virtual machine (e.g., VM 172). In other aspects, one or more components of SDN module 174 may run directly on one or more physical hosts, such as hosts 162. In yet other aspects, SDN module 174 may run on a virtual host that is instantiated by orchestration component 158.

The management plane functionalities are implemented by a management plane, shown as SDN manager 177. SDN manager 177 receives logical network configuration data and generates desired state data that specifies how logical networks 182 should be implemented. This logical network configuration data, for example, includes a description of the logical networking elements (e.g., logical switches and routers) and logical ports in a uniform format (e.g., as a set of database records or another format). SDN manager 177 communicates the desired state data to a control plane, shown as SDN controller 178, that is responsible for distributing the desired state and any updates to the desired state to virtual machines 172 that it manages (e.g., via local controllers). SDN controller 178 also implements the logical network elements by configuring virtual switches, virtual routers, etc. on host machines based on the desired state data. SDN controller 178 implements the control plane functionalities for logical switching and routing functions and manages distributed switching and routing modules in virtualization environment 156. SDN module 174 also provides data plane functionalities, which may include switching capabilities supported by virtual switches (vSwitch) with tunneling (virtual extensible local area network (VXLAN)) functionalities.

SDN module 174 may further provide at least one networking gateway or edge device, shown as edge VM 179. Edge VM 179 (e.g., executing as a virtual appliance) is configured to provide VMs 172 and other components in cloud computing environment 170 with connectivity to external networks (e.g., Internet). Edge VM 179 manages external public IP addresses for virtual data center 180 and one or more private internal networks interconnecting VMs 172. Edge VM 179 is configured to route traffic incoming to and outgoing from virtual data center 180 and provide networking services, such as firewalls, network address translation (NAT), dynamic host configuration protocol (DHCP), and load balancing.

In order to provide the capabilities described above, SDN module 174 is configured using configurations 175. Configurations 175 comprise a set of instructions (e.g., user-defined instructions) that enable and direct the various components and functionalities of SDN module 174 to implement and manage logical networks 182. For example, configurations 175 include instructions for connecting VMs 172 to ports of one or more vSwitches in virtualization environment 156. In another example, configurations 175 include layer-2 (L2) and layer-3 (L3) configurations for providing virtual private network (VPN) and firewall functionalities.

In certain cases, there may be a need to replace or upgrade SDN module 174 to another type of SDN module with different functionalities and capabilities without disrupting virtual data center 180's incoming and outgoing traffic as well as the connectivity between VMs 172. As an example, SDN module 174 may be compatible with only one type of hypervisor. However, in some cases, the underlying infrastructure platform of a cloud computing environment (e.g., infrastructure platform 154) includes various types of hypervisors for virtualizing hardware resources 160. In such an example, SDN module 174 can be upgraded to another SDN module (e.g., SDN module 294 of FIG. 2) to provide network virtualization capabilities to the infrastructure platform with hypervisors that are not compatible with SDN module 174.

An example of one type of SDN module is the VMware NSX-V (NSX for vSphere) available by VMware, Inc., of Palo Alto, Calif. An example of another type of SDN module is the VMware NSX-T available by VMware, Inc., of Palo Alto, Calif. In certain aspects, to deploy the capabilities of VMware NSX-T in a virtual data center where VMware NSX-V is already deployed, a NSX-V to NSX-T migration is performed.

Figure 2:
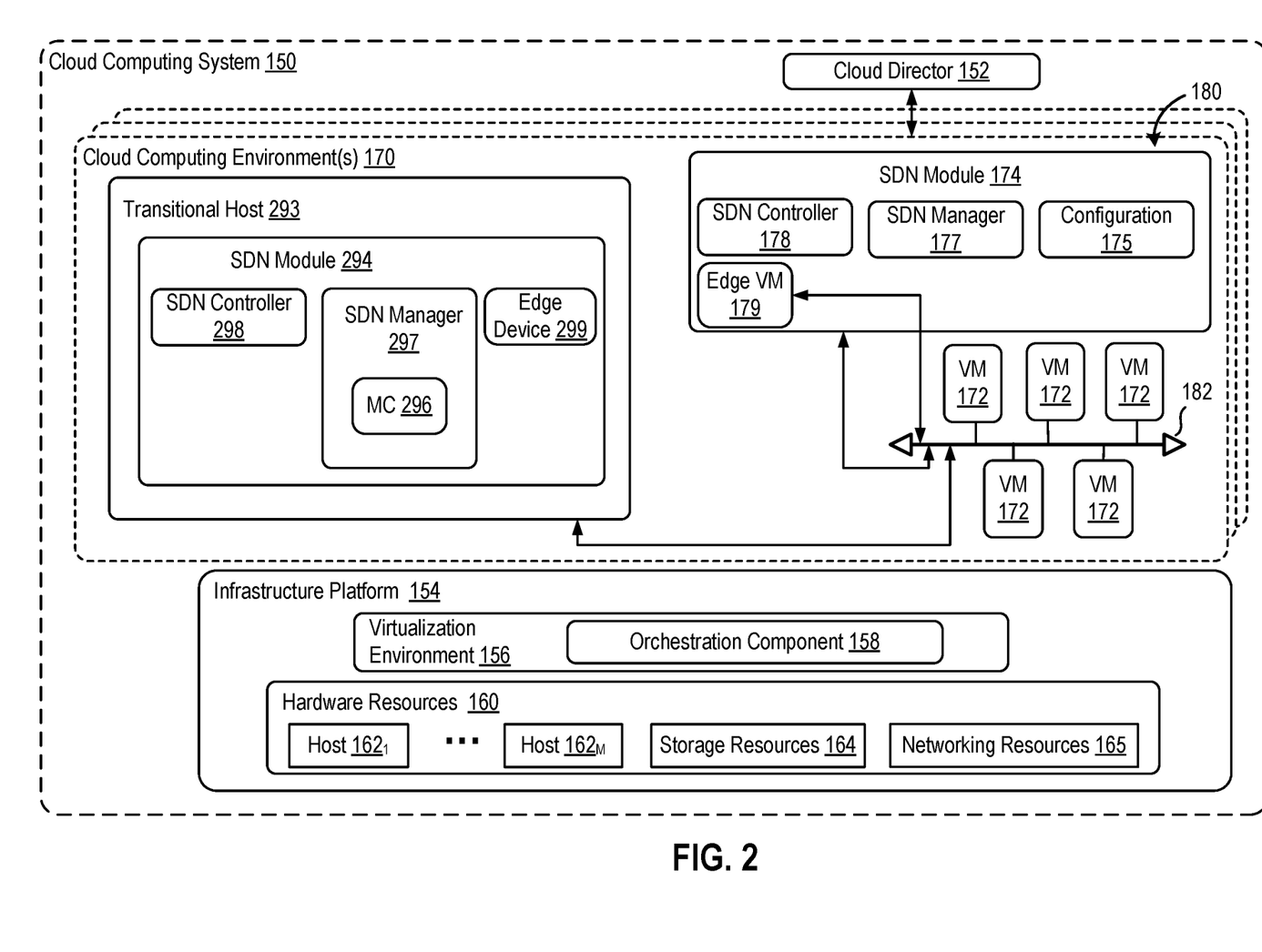
FIG. 2 illustrates an example of the migration of one SDN module to another SDN module in a virtual data center, according to certain aspects described herein

FIG. 2 illustrates an example state in the migration of SDN module 174 (e.g., NSX-V) to SDN module 294 (e.g., NSX-T) in virtual data center 180. An SDN module 174 to SDN module 294 migration may, more specifically, refer to deploying SDN module 294 into virtual data center 180 in order to replace SDN module 174. As described above, to the extent possible, SDN module 294 is deployed with the same configuration (e.g., configuration 175) as that of SDN module 174 to, among other things, avoid disrupting the networking operations of VMs 172 and/or the need for having to reconfigure SDN module 294 from scratch.

In order to perform such a migration, a process, such as a finite state machine, running on one or more virtual hosts instantiated by virtualization environment 156 (or on one or more hosts 162, VMs, etc.), is configured to execute a migration task, including a set of restartable and independent stages. In certain aspects, the stages of the migration task correspond to the states of the finite state machine ("state machine"). In certain aspects, a state machine is a process that can be in exactly one of a finite number of states at any given time. In each state, the state machine executes or triggers the execution of a set of instructions and transitions to the next state in response to, for example, some external inputs or the completion of the execution of some instructions. In certain aspects, the state machine is a distributed state machine such that the stages corresponding to the states of the state machine may be executed by different threads or nodes (e.g., virtual hosts, hosts, VMs, etc.) enabled by virtualization environment 156. As a result, if a node or a thread fails during the execution of a certain stage, the stage can be restarted on another node or thread.

To initiate the migration of SDN module 174 to SDN module 294, in some aspects, the state machine first invokes orchestration component 158 to instantiate a transitional host 293 in virtual data center 180. Transitional host 293, in some aspects, is a virtual host (or alternatively a VM, physical host, etc.) and, as shown, is configured with SDN module 294. Next, the state machine invokes orchestration component 158 to create a number of management appliances on transitional host 293. The management appliances include SDN manager 297 (e.g., NSX-T manager), SDN controller 298 (e.g., NSX-T controller), and one or more edge devices 299 (e.g., edge VMs).

As shown, a migration coordinator (MC) 296 runs on SDN manager 297. MC 296 is a process that configures SDN module 294 and its management appliances with configuration 175. MC 296 then performs a compatibility check to determine if there are any incompatibilities between configuration 175 and SDN module 294 and, thereby, ensures that SDN module 294 can be deployed in virtual data center 180 with configuration 175. In certain aspects, SDN module 294 receives configuration 175 from SDN module 174 via a network connection. Next, assuming there are no incompatibilities between configuration 175 and SDN module 294, virtual switches and/or virtual distributed routers within the kernel modules of the physical hosts in infrastructure platform 154 are reconfigured to ensure that the north-south traffic (e.g., incoming and outgoing data traffic to and from virtual data center 180) relating to VMs 172 utilizes SDN module 294's edge devices (e.g., edge device 299) and not SDN module 174's edge devices (e.g., edge VM 179). For example, the virtual switches and/or virtual distributed routers may be configured with static routes to route traffic to SDN module 294's edge devices. At this point, VMs 172 are still managed by SDN controller 178 and SDN manager 177 of SDN module 174, but receiving and transmitting data from and through SDN module 294's edge device 299. Next, MC 296 configures all the physical hosts in infrastructure platform 154 with SDN module 294 and its related appliances. For example, kernel modules associated with SDN module 294 (e.g., NSX-T kernel modules) are installed on physical hosts in infrastructure platform 154. Subsequently, MC 296 deletes SDN module 174 and SDN module 174s management appliances (e.g., SDN controller 178, SDN manager 177, edge VM 179) and adds all the physical hosts in infrastructure platform 154 as transport nodes in the configuration of SDN module 294. At this point, SDN module 294 is exclusively managing the logical networks in virtual data center 180 without the involvement of SDN module 174. Next, SDN module 294's management appliances are migrated from transitional host 293 to a management cluster of virtualization environment 156. Subsequently, transitional host 293 can be deleted and virtual data center 180 is marked as a data center that uses SDN module 294, at which point the migration of SDN module 174 to SDN module 294 is complete. Each stage of the migration described above corresponds to a state of the state machine involved in the migration.

As described above, a stage in the migration of SDN module 174 to SDN module 294 involves MC 296 determining whether SDN module 294 can be deployed in virtual data center 180 with configuration 175. In some cases, MC 296 identifies one or more configurations in the set of configurations 175 that are incompatible with SDN module 294. Without resolving such incompatibilities, the migration is not able to proceed. For example, configurations 175 of SDN module 174 may have a Layer-2 (L2) VPN enabled, which SDN module 294 may not support. In such an example, the L2 VPN needs to be disabled and replaced with IPsec (Internet Protocol Security) VPN, which SDN module 294 does support. In another example, SDN module 294 may have a limit on the number of firewall rules that can be enabled. However, configurations 175 may have more firewall rules enabled than allowed by SDN module 294.

In cases where incompatibilities are found, a state machine that is not configured according to the aspects described herein may retrieve a list of the incompatibilities or failures from MC 296 and terminate the migration. A user would then intervene through a user interface to modify configurations 175 in order to resolve the incompatibilities. Once the incompatibilities are resolved, the user would need to initiate a new migration. However, terminating the state machine in cases where incompatibilities are found and initiating a new state machine and a new migration session from scratch is not resource efficient.

Accordingly, certain aspects described herein relate to a state machine that is not terminated when incompatibilities are detected by MC 296 and, instead, provides a mechanism for user input to be received and incompatibilities to be resolved while operating. More specifically, in some aspects, when incompatibilities are detected, the state machine pauses its operations for a particular period of time to receive user input and resolve the incompatibilities. As an example, a user may resolve an incompatibly by removing a number of firewall rules or disabling an L2 VPN and enabling an IPsec VPN in configuration 175. Once user input is received and all the incompatibilities are resolved, in some aspects, the state machine proceeds with the migration from where it was paused.

Figure 3:
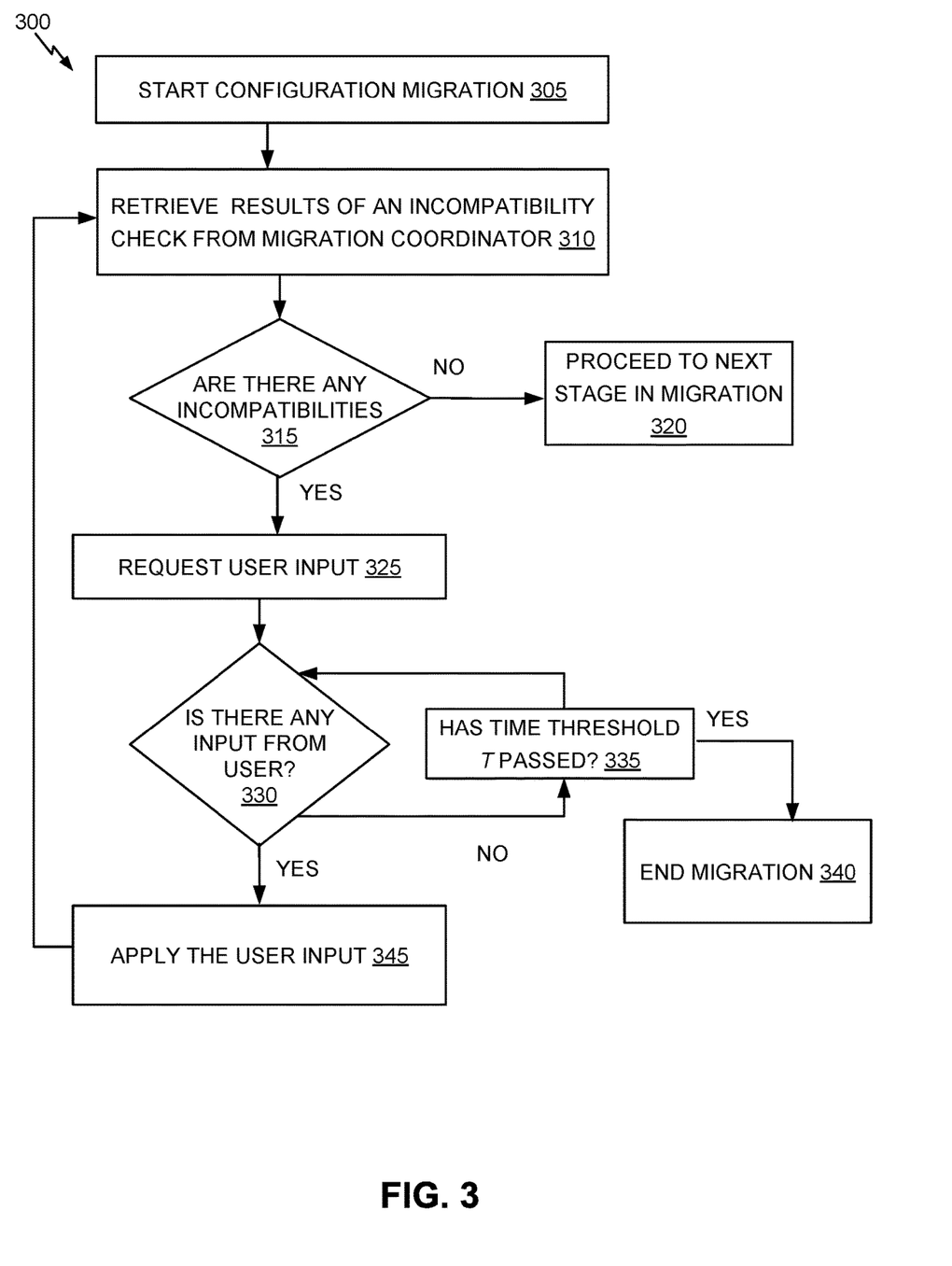
FIG. 3 illustrates example operations of a state machine for performing the migration of FIG. 2, according to certain aspects described herein.

FIG. 3 illustrates example operations or states of a state machine that provides a mechanism for user input to be received and incompatibilities to be resolved while operating, according to certain aspects described herein.

At 305, the state machine invokes MC 296 to initiate the SDN module 174 to SDN module 296 migration with configuration 175. In response, in certain aspects, MC 296 initiates the migration by, among other things, performing a "pre-check" process whereby MC 296 analyzes and determines whether there any incompatibilities between SDN module 294 and configurations 175. Upon invoking MC 296 to initiate the migration, the state machine enters a "retrieve pre-check results" state and begins to poll MC 296 through an application programing interface (API) to determine if any incompatibilities are found by MC 296. If no incompatibilities are found, MC 296 provides an indication to the state machine indicative of the successful completion of the pre-check process. If incompatibilities are found, however, MC 296 provides a failure indication to the state machine indicative of one or more determined incompatibilities.

At 310, the state machine retrieves the results of the incompatibility check (e.g., pre-check) from MC 296. As described above, the results may either indicate a successful completion of the pre-check process or a list of one or more incompatibilities.

At 315, the state machine determines if the results indicate any incompatibilities.

At 320, upon determining that MC 296 has found no incompatibilities between the SDN module 294 and configuration 175, the state machine moves to the next state for performing the subsequent stage in the migration task as discussed. For example, if no incompatibilities are found, virtual switches and/or virtual distributed routers within the kernel modules of the physical hosts in infrastructure platform 154 are reconfigured to ensure that the north-south traffic relating to VMs 172 utilizes SDN module 294's edge devices, etc.

At 325, upon determining that MC 296 has found one or more incompatibilities, the state machine requests user input. More specifically, when there are incompatibilities found by MC 296, the state machine enters a "get user input" state. In this state, the state machine waits for user input for a particular period of time. For example, in certain aspects, the state machine inserts a user input record in a database system in infrastructure platform 154 of FIG. 1. In certain aspects, the database system may be part of storage resources 164 shown in FIG. 1. In certain aspects, the user input record comprises two fields of "last_checked" (e.g., first field) and "last_user_updated" (e.g., second field). The last_checked field indicates the last time at which the state machine queried or checked the user input record for user input. The last_user_updated field indicates the last time the user input record was updated with user input. When the state machine first inserts the user input record in the database, it initializes the last_checked field with the specific time (e.g., 10:11:03 PM) at which the user input record is inserted into the database). At this point in time, the last_user_updated field does not indicate a time that is greater (later) than the time indicated by the last_checked field because no user input has been received yet. For example, the last_user_updated field may indicate a null value. In another example, the last_user_updated field may indicate the same time that is indicated by the last_checked field.

When the user observes that the state machine is in the "get user input" state, the user can provide user input through the API. In other words, the "get user input" state indicates to the user that user input is required (e.g., through a user interface on a display). When user input is provided, the last_user_updated field is updated with the time at which the input is provided. As described below, by comparing the time indicated by the last_checked field and the time indicated by the last_user_updated field, the state machine is able to determine whether user input has been received.

At 330, the state machine periodically determines whether any user input was received from the user. More specifically, the state machine periodically queries the database system to determine if the last_user_updated field indicates a time that is greater than the time indicated by the last_checked field. If the time indicated by the last_checked field is greater than the time indicated by last_user_updated field, the state machine determines that no user input has been received yet by the user. This is because if user input were received, the time indicated by the last_user_updated field would be greater than the time indicated by last_checked field. Upon determining that no user input has been received, the state machine is configured to periodically loop back to check the user input record, unless a threshold time T has passed (e.g., threshold time measured from when the user input record was first created or since the time indicated by last_checked field). Every time the state machine checks the user input record, the last_checked field is updated with the current time (the last time at which the state machine checks the user input record).

At 335, the state machine determines whether the time threshold T has passed. If time threshold T has passed, in certain aspects, the state machine moves to step 340 to terminate the migration because without resolving the determined incompatibilities, the migration may not be able to proceed. If time threshold T has not passed, as described above, the state machine continues to periodically loop back and check whether user input has been received. In some aspects, time threshold T is user configurable.

At 345, upon determining that user input has been received, the state machine moves to the next state of applying the user input. More specifically, when the state machine determines that user input has been received, it updates the last_user_updated field with the current time and applies the user input to MC 296. Applying the user input to MC 296 may include indicating the user input to MC 296. Based on the user input, MC 296 alters configurations 175 to resolve the identified one or more incompatibilities. As an example, if an identified incompatibility relates to configurations 175 having a L2 VPN enabled, MC 296 alters configurations 175 to disable the L2 VPN and enable IPsec VPN. In another example, if an identified incompatibility relates to configurations 175 having a higher number of firewall rules than what is allowed by SDN module 294, MC 296 alters configurations 175 to disable some of the firewall rules.

At this point, it is possible that MC 296 may have identified additional incompatibilities since the first set of one or more incompatibilities, that are now resolved, were identified by MC 296. Accordingly, in certain aspects, the state machine loops back to the "retrieve pre-check results" state (step 310) to retrieve the results of any subsequent incompatibility check performed by MC 296. The state machine then moves to step 320 to determine whether MC 296's incompatibility check indicates a successful completion or a failure with one or more additional incompatibilities. If the state machine determines that there were no additional incompatibilities, the state machine moves to the next migration task at 315. If the state machine determines that there were additional incompatibilities, the state machine moves to step 325 and continues to loop around, as described above until all incompatibilities are identified and resolved.

Accordingly, the aspects described herein provide a technical solution to a technical problem of having to terminate a state machine, while performing the migration described above, in cases where incompatibilities are found and having to initiate a new state machine and a new migration session from scratch, which is very resource inefficient. More specifically, terminating a state machine and initiating a new state machine from scratch consumes computing cycles and memory resources that could otherwise be used by other tasks and/or nodes in a data center. The state machine described according to the aspects herein, however, is not terminated when incompatibilities are detected and, instead, provides a mechanism for user input to be received and incompatibilities to be resolved while operating. There is, accordingly, no need for initiating a new state machine and a new migration session. This technical solution, thereby, reduces the computing cycles and memory resources required for performing migration, such as the migration described above.

The various aspects described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more aspects of the invention may be useful machine operations. In addition, one or more aspects of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various aspects described herein may be practiced with other computer system configurations including handheld devices, microprocessor systems, microprocessor-based or programmable consumer electronics, minicomputers, mainframe computers, and the like.

One or more aspects of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more aspects of the present invention have been described in some detail for clarity of understanding, it will be apparent that certain changes and modifications may be made within the scope of the claims. Accordingly, the described aspects are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various aspects may be implemented as hosted aspects, non-hosted aspects or as aspects that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating a first module to a second module in a data center, comprising:
    initiating a migration of the first module to the second module, wherein the first module operates according to a configuration;
    after the initiating, retrieving results of a compatibility check performed by a migration coordinator to determine potential incompatibilities between the configuration of the first module and the second module, the results including a first set of incompatibilities to be resolved;
    entering a state to indicate to a user that user input relating to the first set of incompatibilities is requested;
    inserting a user input record in a database system of an infrastructure platform supporting the data center;
    periodically determining whether user input relating to the first set of incompatibilities has been received by querying the user input record in the database system; and
        upon determining that user input relating to the first set of incompatibilities has not been received, continuing the periodically determining;
        upon determining that user input relating to the first set of incompatibilities has been received, indicating the received user input to the migration coordinator, wherein the migration coordinator alters the configuration to resolve the first set of incompatibilities based on the user input.

2. The method of claim 1, wherein subsequent to indicating the received user input to the migration coordinator, the method further comprising:
   requesting results of another compatibility check performed by the migration coordinator after determining the first set of incompatibilities;
   upon determining that the results indicate no additional incompatibilities, proceeding to a next step of the migration, wherein in the next step of the migration the second module initiates a management of one or more logical networks previously managed by the first module, and wherein in the next step of the migration the first module is removed from the data center;
   upon determining that the results indicate a second set of incompatibilities, proceeding to resolving the second set of outstanding elements by requesting user input relating to the second set of incompatibilities.

3. The method of claim 1, wherein the user input record comprises a number of fields including a first field that indicates a last time that the user input record was updated and a second field that indicates a last time that the user input was checked, the method further comprising:
   initializing the first field with a time at which the user input record was inserted.

4. The method of claim 3, wherein determining whether user input relating to the first set of incompatibilities has been received by querying the user input record in the database system further comprises:
   querying the user input record to determine a time indicated by the first field and a time indicated by the second field, wherein each time the user input record is queried the first field is updated with a last time at which the user input record is queried; and
   comparing, based on the querying of the user input record, the time indicated by the first field with a time indicated by the second field.

5. The method of claim 4, wherein determining that user input relating to the first set of incompatibilities has not been received further comprises:
   comparing the time indicated by the first field with the time indicated by the second field; and
   determining that the time indicated by the first field is after the time indicated by the second field.

6. The method of claim 4, wherein determining that user input relating to the first set of incompatibilities has been received further comprises:
   comparing the time indicated by the first field of the user input record with the time indicated by the second field; and
   determining that the time indicated by the second field of the user input record is after the time indicated by the first field.

7. The method of claim 4, wherein the second field is updated with a current time at which user input is received.

8. The method of claim 1, further comprising:
   terminating the migration upon determining that user input relating to the first set of incompatibilities has not been received and that a time threshold is reached.

9. A computer system, comprising:
   a non-transitory memory comprising executable instructions; and
   a processor in data communication with the memory and configured to execute the executable instructions to cause the computer system to:
      initiate a migration of the first module to the second module, wherein the first module operates according to a configuration;
      after the migration is initiated, retrieve results of a compatibility check performed by a migration coordinator to determine potential incompatibilities between the configuration of the first module and the second module, the results including a first set of incompatibilities to be resolved;
      enter a state to indicate to a user that user input relating to the first set of incompatibilities is requested;
      insert a user input record in a database system of an infrastructure platform supporting the data center;
      periodically determine whether user input relating to the first set of incompatibilities has been received by querying the user input record in the database system; and
      upon determining that user input relating to the first set of incompatibilities has not been received, continue the periodically determining;
      upon determining that user input relating to the first set of incompatibilities has been received, indicate the received user input to the migration coordinator, wherein the migration coordinator alters the configuration to resolve the first set of incompatibilities based on the user input.

10. The computer system of claim 9, wherein subsequent to indicating the received user input to the migration coordinator, and wherein the processor is further configured to execute the executable instructions to cause the computer system to:
   request results of another compatibility check performed by the migration coordinator after determining the first set of incompatibilities;
   upon determining that the results indicate no additional incompatibilities, proceed to a next step of the migration, wherein in the next step of the migration the second module initiates a management of one or more logical networks previously managed by the first module, and wherein in the next step of the migration the first module is removed from the data center;
   upon determining that the results indicate a second set of incompatibilities, proceed to resolving the second set of outstanding elements by requesting user input relating to the second set of incompatibilities.

11. The computer system of claim 9, wherein the user input record comprises a number of fields including a first field that indicates a last time that the user input record was updated and a second field that indicates a last time that the user input was checked, and wherein the processor is further configured to execute the executable instructions to cause the computer system to:
   initialize the first field with a time at which the user input record was inserted.

12. The computer system of claim 11, wherein the processor causing the computer system to determine whether user input relating to the first set of incompatibilities has been received by querying the user input record in the database system further comprises the processor causing the computer system to:
   query the user input record to determine a time indicated by the first field and a time indicated by the second field, wherein each time the user input record is queried the first field is updated with a last time at which the user input record is queried; and compare, based on the querying of the user input record, the time indicated by the first field with a time indicated by the second field.

13. The computer system of claim 12, wherein the processor causing the computer system to determine that user input relating to the first set of incompatibilities has not been received further comprises the processor causing the computer system to:

compare the time indicated by the first field with the time indicated by the second field; and determine that the time indicated by the first field is after the time indicated by the second field.

14. The computer system of claim 12, wherein the processor causing the computer system to determine that user input relating to the first set of incompatibilities has been received further comprises the processor causing the computer system to:

compare the time indicated by the first field of the user input record with the time indicated by the second field; and determine that the time indicated by the second field of the user input record is after the time indicated by the first field.

15. The computer system of claim 12, wherein the second field is updated with a current time at which user input is received.

16. The computer system of claim 9, wherein the processor further causes the computer system to:

terminate the migration upon determining that user input relating to the first set of incompatibilities has not been received and that a time threshold is reached.

17. A computer system, comprising:

means for initiating a migration of the first module to the second module, wherein the first module operates according to a configuration;

means for retrieving results of a compatibility check performed by a migration coordinator to determine potential incompatibilities between the configuration of the first module and the second module, the results including a first set of incompatibilities to be resolved, after the initiating;

means for entering a state to indicate to a user that user input relating to the first set of incompatibilities is requested;

means for inserting a user input record in a database system of an infrastructure platform supporting the data center;

means for periodically determining whether user input relating to the first set of incompatibilities has been received by querying the user input record in the database system; and upon determining that user input relating to the first set of incompatibilities has not been received, means for continuing the periodically determining;

upon determining that user input relating to the first set of incompatibilities has been received, means for indicating the received user input to the migration coordinator, wherein the migration coordinator alters the configuration to resolve the first set of incompatibilities based on the user input.

18. The computer system of claim 17, the computer system further comprising:

means for requesting results of another compatibility check performed by the migration coordinator after determining the first set of incompatibilities; and upon determining that the results indicate no additional incompatibilities, means for proceeding to a next step of the migration, wherein in the next step of the migration the second module initiates a management of one or more logical networks previously managed by the first module, and wherein in the next step of the migration the first module is removed from the data center;

upon determining that the results indicate a second set of incompatibilities, means for proceeding to resolving the second set of outstanding elements by requesting user input relating to the second set of incompatibilities.

19. A non-transitory computer readable medium having instructions stored thereon for performing a method comprising:

initiating a migration of the first module to the second module, wherein the first module operates according to a configuration;

after the initiating, retrieving results of a compatibility check performed by a migration coordinator to determine potential incompatibilities between the configuration of the first module and the second module, the results including a first set of incompatibilities to be resolved;

entering a state to indicate to a user that user input relating to the first set of incompatibilities is requested;

inserting a user input record in a database system of an infrastructure platform supporting the data center;

periodically determining whether user input relating to the first set of incompatibilities has been received by querying the user input record in the database system; and upon determining that user input relating to the first set of incompatibilities has not been received, continuing the periodically determining;

upon determining that user input relating to the first set of incompatibilities has been received, indicating the received user input to the migration coordinator, wherein the migration coordinator alters the configuration to resolve the first set of incompatibilities based on the user input.

20. The non-transitory computer readable medium of claim 19, wherein subsequent to indicating the received user input to the migration coordinator, the method further comprising:

requesting results of another compatibility check performed by the migration coordinator after determining the first set of incompatibilities;

upon determining that the results indicate no additional incompatibilities, proceeding to a next step of the migration, wherein in the next step of the migration the second module initiates a management of one or more logical networks previously managed by the first module, and wherein in the next step of the migration the first module is removed from the data center;

upon determining that the results indicate a second set of incompatibilities, proceeding to resolving the second set of outstanding elements by requesting user input relating to the second set of incompatibilities.

* * * * *